United States Patent
Lee et al.

(10) Patent No.: US 11,810,684 B2
(45) Date of Patent: Nov. 7, 2023

(54) METHOD OF TREATING RADIOACTIVE WASTE RESIN AND AN EQUIPMENT THEREFOR

(71) Applicant: KOREA ATOMIC ENERGY RESEARCH INSTITUTE, Daejeon (KR)

(72) Inventors: Ki Rak Lee, Daejeon (KR); Hwan Seo Park, Daejeon (KR); Geun Il Park, Daejeon (KR); Hong Joo Ahn, Daejeon (KR); Jung Hoon Choi, Daejeon (KR); Hyun Woo Kang, Daejeon (KR); In Tae Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 65 days.

(21) Appl. No.: 17/410,097

(22) Filed: Aug. 24, 2021

(65) Prior Publication Data

US 2022/0068517 A1    Mar. 3, 2022

(30) Foreign Application Priority Data

Aug. 25, 2020  (KR) .................. 10-2020-0107392
Jul. 9, 2021   (KR) .................. 10-2021-0090575

(51) Int. Cl.
*G21F 9/30* (2006.01)
*B01D 53/00* (2006.01)
*B01D 53/04* (2006.01)
*G21F 9/08* (2006.01)
*G21F 9/12* (2006.01)

(52) U.S. Cl.
CPC ............. *G21F 9/30* (2013.01); *B01D 53/002* (2013.01); *B01D 53/04* (2013.01); *G21F 9/08* (2013.01); *G21F 9/12* (2013.01); *B01D 2253/10* (2013.01); *B01D 2257/708* (2013.01); *B01D 2259/40088* (2013.01)

(58) Field of Classification Search
CPC ..... G21F 9/30; G21F 9/08; G21F 9/12; B01D 53/002; B01D 53/04; B01D 2253/10; B01D 2257/708; B01D 2259/40088
USPC .......................................... 588/18
See application file for complete search history.

(56) References Cited

FOREIGN PATENT DOCUMENTS

| | | |
|---|---|---|
| JP | H02112796 A | 4/1990 |
| JP | H02-287299 A | 11/1990 |
| JP | H0727076 B2 | 3/1995 |
| KR | 100739855 B1 | 7/2007 |
| KR | 101072004 B1 | 10/2011 |
| KR | 101233542 B1 | 2/2013 |
| KR | 101279718 B1 | 6/2013 |
| KR | 101533977 B1 | 7/2015 |
| KR | 101545440 B1 | 8/2015 |
| KR | 101707533 B1 | 2/2017 |
| KR | 101907922 B1 | 10/2018 |
| KR | 102005680 B1 | 7/2019 |
| KR | 102043680 B1 | 11/2019 |
| KR | 102054739 B1 | 12/2019 |

OTHER PUBLICATIONS

KR Office Action dated Jan. 19, 2023 for corresponding KR Patent Application No. 10-2021-0090575.
KR Office Action dated Feb. 14, 2023 for corresponding KR Patent Application No. 10-2021-0110524) and the references cited therein.

*Primary Examiner* — Edward M Johnson
(74) *Attorney, Agent, or Firm* — Harness, Dickey & Pierce, P.L.C.

(57) ABSTRACT

The present invention relates to a method of separating and removing a radioactive nuclide, particularly, C-14 and tritium from a radioactive waste resin, and an equipment therefor. The method of treating a radioactive waste resin of the present invention includes recycling of condensate water from which a C-14 radionuclide in the condensate water is removed, into a treatment part for a radioactive waste resin.

12 Claims, 5 Drawing Sheets

METHOD OF TREATING RADIOACTIVE WASTE RESIN AND AN EQUIPMENT THEREFOR

CROSS-REFERENCE TO RELATED APPLICATIONS

This application is based on and claims priority under 35 U.S.C. § 119 to Korean Patent Application Nos. 10-2021-0090575, filed on Jul. 9, 2021, and 10-2020-0107392, filed on Aug. 25, 2020 in the Korean Intellectual Property Office, the disclosure of each of which is incorporated by reference herein in its entirety.

FIELD OF THE INVENTION

The present invention relates to a method of separating and removing $^{14}C$ (hereinafter, will be referred to as "C-14" or "C-14 radionuclide") and tritium (T or $^3H$) at high efficiency from an exhaust gas generated during treating a radioactive waste resin, particularly, a radioactive waste resin generated in a heavy-water reactor type nuclear power plant, and an equipment therefor.

DESCRIPTION OF THE RELATED ART

Waste resins generated in a moderator system, a heat transport system, a shield cooling system, a nuclear fuel storage system, or the like during operating a heavy-water reactor type nuclear power plant, have been classified into low and intermediate level radioactive waste and stored and managed in a waste resin storage tank, without much difficulty, and it doesn't cost much for treating the waste resins. However, recently, it becomes known that there is a high risk of $^{14}C$ among anionic radioactive carbon contained in waste resins, and the clearance level of waste according to the concentration of $^{14}C$ in a waste resin has come to be regulated.

Particularly, waste resins are generally generated in a process for removing various radionuclides in various liquid waste disposal systems of a nuclear power plant, and particularly in a heavy-water nuclear power plant, a great deal of C-14 radionuclides are generated in a moderator system by the $^{17}O$ ($\eta$, $\alpha$) $^{14}C$ reaction by $^{17}O$ contained in heavy water according to the use of the heavy water. In addition, in the case of using a cation-anion mixed ion exchange resin (hereinafter, "mixed waste resin") for removing Co-60, Cs-137, or the like, which are cationic radioactive nuclides, C-14 which is an anionic radioactive nuclide is also removed, and Co-60, Cs-137, or the like are contained in a cationic waste resin, while a C-14 radionuclide is included in a carbonate ($H^{14}CO_3$) type in an anionic waste resin. Such a mixed waste resin is stored in a large tank (storage pool) together with an aqueous solution containing the radioactive nuclide of tritium, without separating the cationic resin and the anionic resin. Accordingly, as a technique for separating and removing the radioactive nuclides from the mixed waste resin stored in the large tank, a technique for separating and removing C-14 and tritium is also required.

The conventional technique of treating a waste resin, developed for securing the capacity of such a waste resin storage tank and reducing the volume of waste, mainly includes a process using an acid solution such as hydrochloric acid and nitric acid of a high concentration, an incineration heat treatment process, a wet oxidation process, a process using a supercritical $CO_2$ gas, or the like. However, such a technique is accompanied with the corrosion problems of an equipment according to the treatment of the waste resin in an acid solution and at a high temperature, and there are problems of requiring a large-sized equipment and process conditions of a high temperature and a high pressure. In addition, in most techniques, a large amount of a $CO_2$ gas is generated due to the decomposition of organic materials which are the structure of the waste resin as well as a C-14 radionuclide in the waste resin, and an additional process with high cost for additionally treating $CO_2$ of a high concentration is required, and at the same time, most of the radioactive nuclides such as Co-60 and Cs-137 are detached from the cationic waste resin and volatilized into a gas phase, and big problems of treating secondary waste occur.

In order to reduce such problems, a technique for effectively removing only a C-14 radionuclide in a mixed waste resin to be treated using a direct heat treatment process utilizing microwaves, or the like, has been designed to increase the removing efficiency of the C-14 radionuclide in the waste resin, but by this technique, a storing solution containing moisture and tritium contained in a waste resin together with a C-14 radionuclide (for example, tritiated water containing tritium, such as $T_2O$, HTO and DTO) is also volatilized into a vapor type and flowed into a subsequent treatment process, and C-14 is required to be separated and removed for reducing the generation amount of waste in the subsequent treatment process. In addition, by the technique of removing tritium in an exhaust gas condensate water generated after treating a waste resin in a subsequent treatment process, in the case of containing a C-14 radionuclide in the exhaust gas condensate water, since a tritium removing process is not advantageously performed, a technique for separating the C-14 radionuclide at high efficiency from the exhaust gas and/or the condensate water thereof, generated by the treatment of the waste resin, is required.

SUMMARY OF THE INVENTION

An aspect of the present invention is to provide a method of separating and removing at high efficiency, C-14 radionuclide in an exhaust gas and/or the condensate water thereof, essentially generated in a process of separating a radioactive nuclide from a radioactive waste resin generated by the operation of a nuclear power plant, and an equipment therefor.

In addition, an aspect of the present invention provides a method of removing a C-14 radionuclide in the exhaust gas and/or the condensate water thereof at high efficiency to increase the process efficiency of the removing process of tritium afterward, and an equipment therefor.

Further, an aspect of the present invention provides a method of reducing the generation amount of the secondary waste of the treatment process of a waste resin by recycling condensate water from which a C-14 radionuclide is removed into the treatment process of a waste resin, and an equipment therefor.

In order to achieve the object, the present invention provides a method of treating a radioactive waste resin including: (S1) condensing tritiated water-containing vapor in an exhaust gas derived from a treatment part for a radioactive waste resin; in a condensation part; (S2) discharging and removing a gas including a C-14 radionuclide-containing compound in the exhaust gas from the condensation part; and (S3) recycling tritiated water-containing condensate water in the condensation part into the treatment part for a radioactive waste resin.

In addition, the present invention provides an equipment for treating a radioactive waste resin, including: a treatment part for a radioactive waste resin; a condensation part for condensing tritiated water-containing vapor in an exhaust gas derived from the treatment part for a radioactive waste resin; an exhaust gas supplying line for supplying the exhaust gas from the treatment part for a radioactive waste resin to the condensation part; a C-14 radionuclide removing part for removing a gas separated and discharged from the condensation part and including a C-14 radionuclide-containing compound; and a condensate water recycling line for recycling the tritiated water-containing condensate water in the condensation part into the treatment part for a radioactive waste resin.

Advantageous Effect

By using the method of treating a radioactive waste resin of the present invention, effects of removing a C-14 radionuclide-containing compound from a condensate water of an equipment for treating an exhaust gas and/or a radioactive waste resin, generated during treating the radioactive waste resin, may be obtained at high efficiency.

In addition, by using the method of treating a radioactive waste resin of the present invention, condensate water from which a C-14 radionuclide-containing compound is removed, may be reused in a process of treating the radioactive waste resin, and effects of reducing the amount of secondary waste generated during treating the radioactive waste resin may be shown.

Further, since all the C-14 radionuclide-containing compounds may be separated and recovered from an exhaust gas generated during treating the radioactive waste resin and/or the condensate water of an equipment for treating a radioactive waste resin, improving effects of recycling of a C-14 radionuclide may be shown.

Also, since a C-14 radionuclide-containing compound in condensate water may be removed at high efficiency, increasing effects of the efficiency of the removing process of condensate water and tritiated water may be shown.

BRIEF DESCRIPTION OF THE DRAWINGS

The accompanying drawings in the present disclosure illustrate preferred embodiments of the present invention and play the role of further understanding of the technical spirit of the present invention together with the above-described contents of the present invention. Therefore, the present invention should not be construed as limited to the accompanying drawings.

DETAILED DESCRIPTION OF THE PREFERRED EMBODIMENT

Hereinafter, the present invention will be explained in detail referring to attached drawings. It will be understood that terms or words used in the present disclosure and claims should not be interpreted as having a meaning that is defined in common or in dictionaries, but should be interpreted in consistent with the technical scope of the present invention based on the principle that inventors may appropriately define the concept of the terms to explain the invention at his best method. An equipment for treating a radioactive waste resin, shown in FIG. 1 includes a treatment part for a radioactive waste resin (100), a condensation part (200) and a C-14 radionuclide removing part (300) for removing a gas including a C-14 radionuclide-containing compound discharged from condensate water in the condensation part. In addition, an exhaust gas supplying line (102) for discharging the gas including the C-14 radionuclide-containing compound from the treatment part for a radioactive waste resin (100) to the condensation part (200), a discharging line of a gas including a C-14 radionuclide-containing compound (203) for discharging the gas including the C-14 radionuclide-containing compound from the condensation part, a re-condensate water recycling line (302) for re-condensing by supplying moisture from which the gas including the C-14 radionuclide-containing compound is removed and separated at the C-14 radionuclide removing part (300), and a condensate water recycling line (201) for recycling the condensate water from which the gas including the C-14 radionuclide-containing compound is removed into the treatment part for a radioactive waste resin.

Figure 2:
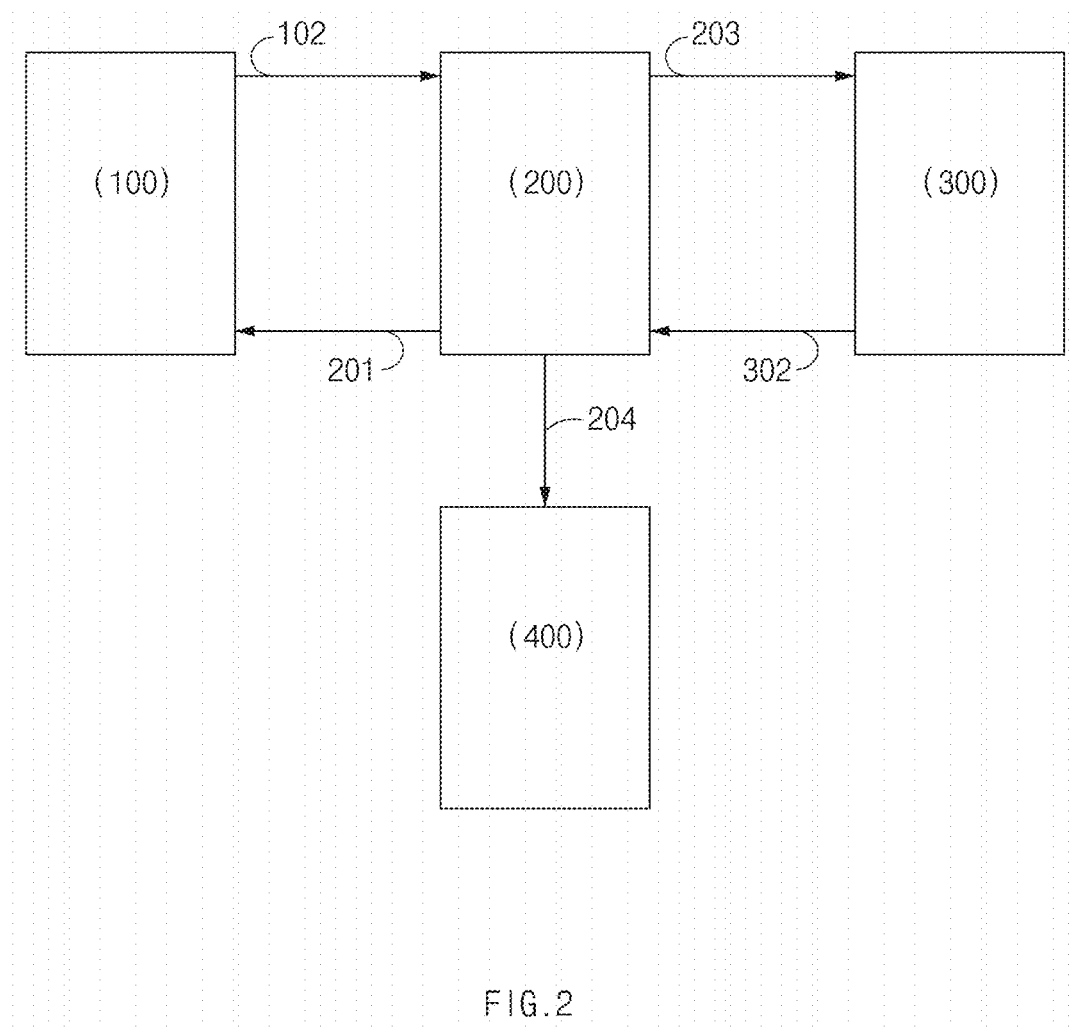
FIG. 2 is a schematic diagram of an equipment for treating a radioactive waste resin according to an embodiment of the present invention.

In addition, the equipment for treating a radioactive waste resin, shown in FIG. 2 may further include a tritiated water removing part (400) for removing tritiated water in condensate water discharged from the condensation part. In addition, a condensate water discharging line (204) for discharging the condensate water from the condensation part to the tritiated water removing part, may be further included.

The method of treating a radioactive waste resin of the present invention may include: (S1) condensing tritiated water-containing vapor in an exhaust gas derived from a treatment part for a radioactive waste resin (100), in a condensation part (200); (S2) discharging and removing a gas including a C-14 radionuclide-containing compound in the exhaust gas from the condensation part (200); and (S3) recycling tritiated water-containing condensate water in the condensation part (200) into the treatment part for a radioactive waste resin (100).

In the present invention, the "C-14 radionuclide-containing compound" may mean all compounds including a $^{14}C$ element, particularly, $^{14}CO_2$, present in an exhaust gas discharged from the treatment part for a radionuclide waste resin.

In the present invention, the "tritiated water" may include at least one selected from the group consisting of $T_2O$, HTO and DTO.

In an embodiment, the method of treating a radioactive waste resin of the present invention may further include, prior to step (S1), (S0) heating the radioactive waste resin in the presence of tritiated water-containing moisture in the treatment part for a radioactive waste resin (100) to generate an exhaust gas including the tritiated water-containing vapor and the C-14 radionuclide-containing compound. For example, if heating is performed utilizing microwaves in the presence of the tritiated water-containing moisture, the removing efficiency of the C-14 radionuclide-containing compound from the waste resin may be improved by the vibration of water molecules around the waste resin, and effects of reducing the amount of secondary waste may be achieved by reusing condensate water derived from the condensation part (200) or the C-14 radionuclide removing part (300), as explained later.

In an embodiment, the heating may be performed under a temperature of 60 to 140° C. within 2 hours, preferably, under a temperature of 90 to 110° C. for 1 hour and 30 minutes to 2 hours.

In an embodiment, the method of treating a radioactive waste resin of the present invention may further include (S4) removing tritiated water in the condensate water by discharging tritiated water-containing condensate water in the condensation part (200). A radioactive waste resin derived from a nuclear power plant, particularly, a radioactive waste resin derived from a heavy-water reactor type nuclear power plant is stored together with a storing solution (aqueous solution). In this case, the storing solution contains tritiated water, and tritiated water contained in an exhaust gas derived from the treatment part for a radioactive waste resin is required to be discharged in a condensate water type to finally remove thereof.

In the method of treating a radioactive waste resin of the present invention, after removing the C-14 radionuclide-containing compound from the exhaust gas derived from the treatment part for a radioactive waste resin (100), condensate water from which the C-14 radionuclide-containing compound is removed is recycled into the treatment part for a radioactive waste resin (100), and accordingly, the concentration of the C-14 radionuclide-containing compound in the condensate water may decrease, and the concentration of tritiated water may gradually increase.

The removing step of the tritiated water may preferably be performed after recovering condensate water of which reuse once or more is completed. Particularly, the treating process of the tritiated water is effective to a concentration degree of 2 mol % of the tritiated water in the condensate water, and the recycling number of the condensate water is not specifically limited, but if the concentration of the tritiated water in the recycling condensate water is greater than the aforementioned value, it may be preferred that the recycling of the condensate water is discontinued, and the reused condensate water is recovered to be supplied to the removing step of tritiated water.

Step (S1) is for condensing tritiated water-containing vapor in an exhaust gas supplied from the treatment part for a radioactive waste resin (100) to form condensate water.

In the treatment part for a radioactive waste resin (100), a known process for separating radioactive nuclides from a radioactive waste resin and a storing solution may be performed, and the method of treating a radioactive waste resin of the present invention is not limited to a particular process in the treatment part for a radioactive waste resin (100). The process in the treatment part for a radioactive waste resin may include, for example, a treating process with an acid solution such as hydrochloric acid and nitric acid of a high concentration, an incineration and heat treatment process, a wet oxidation process, a separating process by a supercritical $CO_2$ gas, a direct heating process utilizing microwaves, or the like, and considering problems such as the corrosion of an equipment and the detaching of radionuclides captured, the direct heating process utilizing microwaves may preferably be performed alone, or in combination with the remaining process, without limitation.

In an embodiment, the radioactive waste resin may be a radioactive waste resin derived from a heavy water reactor.

The radioactive waste resin may include various radioactive nuclides such as C-14, Co-60 and Cs-137, and in addition, may be stored together with a storing solution including C-14, tritium, or the like.

By the separating process of the radioactive nuclides from the radioactive waste resin and the storing solution in the treatment part for a radioactive waste resin (100), an exhaust gas including a C-14 radionuclide-containing compound and tritiated water-containing vapor may be generated. In this case, the exhaust gas generated thus generated is supplied to the condensation part (200) for condensing the tritiated water-containing vapor in the exhaust gas in the condensation part (200).

The condensing step of the tritiated water-containing vapor in the exhaust gas may be performed by applying a high pressure to the exhaust gas supplied, by reducing a temperature, or the like, and the means is not limited.

In an embodiment, if the separating process of the C-14 radionuclide-containing compound is performed utilizing microwaves in the treatment part for a radioactive waste resin (100), the properties of condensate water recovered from the condensation part (200) by condensing the tritiated water-containing vapor in the exhaust gas derived from the treatment part for a radioactive waste resin, may include, for example, a pH of 6.5 to 9, particularly, 6.9 to 8.5, without limitation. In addition, the concentration of $Cs^+$ may be less than a detection limit, and the concentration of $SO_4^{2-}$ may be less than 10 ppm, on the contrary, the concentration of $CO_3^{2-}$ may be 500 ppm or more, particularly, 1,000 ppm or more, 1,500 ppm or more, 2,000 ppm or more. Here, the mass number of carbon in $CO_3^{2-}$ is not designated.

Step (S2) is for removing a C-14 radionuclide-containing compound by discharging a gas including the C-14 radionuclide-containing compound from the condensation part (200) to the exterior of the condensation part (200).

In an embodiment, the discharging of the gas including the C-14 radionuclide-containing compound from the condensation part may include discharging the gas including the C-14 radionuclide-containing compound in a gas phase by injecting an acid solution to the condensate water in the condensation part (200). The acid solution may include at least one buffer solution among $NH_4H_2PO_4$ and $H_3PO_4$. In addition, the acid solution may allow the pH of the condensate water in a range of 3 to 5. The C-14 radionuclide in the condensate water may be included in a carbonate ($H^{14}CO_3$) type, and by the injection of the acid solution, the C-14 radionuclide may be discharged in a $^{14}CO_2$ type from the carbonate.

In an embodiment, the discharging of the gas including the C-14 radionuclide-containing compound from the condensation part (200) may include discharging by heating the condensate water in the condensation part (200) to 40° C. to 90° C. and volatilizing the gas including the C-14 radionuclide-containing compound. By heating the condensate water, the C-14 radionuclide may be discharged in a $^{14}CO_2$ type, and a gas including the C-14 radionuclide-containing compound may be discharged. The gas including the C-14 radionuclide-containing compound in the condensate water is present to a degree of a $CO_2$ solubility, and if the heating temperature is 60° C., the $CO_2$ solubility is less than 0.5 g-$CO_2$/kg-condensate water, and if heated to the temperature, a gas including 99% or more of the C-14 radionuclide-containing compound may be volatilized and separated, but the effects of the present invention are not limited thereto.

In an embodiment, in order to improve the discharging efficiency of the gas including the C-14 radionuclide-containing compound from the condensate water, a stirring step of the condensate water in the condensation part (200) may be further included.

In an embodiment, step (S2) may include removing a C-14 the radionuclide-containing compound by transporting the gas including the C-14 radionuclide-containing compound from the condensation part (200) to the C-14 radionuclide removing part (300), and then adsorbing. Particularly, the C-14 radionuclide-containing compound may be removed using an adsorbent with respect to the C-14 radionuclide-containing compound.

In an embodiment, step (S2) may further include a step of separating and re-condensing the tritiated water-containing vapor remaining in the adsorbent by heating the adsorbent, and then, recycling into the condensation part (200).

For adsorbing the gas including the C-14 radionuclide-containing compound to the adsorbent, heating may be performed utilizing microwaves, and during heating the adsorbent, air or an inert gas may be supplied to the C-14 radionuclide removing part.

In using the adsorbent with respect to the C-14 radionuclide-containing compound, the adsorbent may be heated, and the temperature may be 100° C. to 850° C., particularly, 600 to 700° C. In the adsorbent, tritiated water-containing vapor may be included in addition to the C-14 radionuclide-containing compound, and since the C-14 radionuclide-containing compound is adsorbed in a type of $CaCO_3$ or $BaCO_3$, which has a decomposition temperature of 850° C. or more, the C-14 radionuclide-containing compound is not separated at that heating temperature, and only the tritiated water-containing vapor is separated.

By re-condensing and recycling the tritiated water-containing vapor separated from the adsorbent into the condensation part (200), the removing ratio of the gas including the C-14 radionuclide-containing compound which is present in the condensate water derived from the treatment part for a radioactive waste resin, may increase, and the condensate water in which the concentration of tritiated water is raised even further may be recycled into the treatment part for a waste resin (100).

In an embodiment, step (S2) may further include a step of additionally condensing the tritiated water-containing vapor in the exhaust gas. If the condensate water is insufficiently heated in the condensation part (200), the gas including the C-14 radionuclide-containing compound discharged from the condensation part (200) may contain an excessive amount of moisture, and if transported to the C-14 radionuclide removing part (300), the adsorbent may be destroyed. Accordingly, residual moisture in the gas including the C-14 radionuclide-containing compound is additionally condensed and removed in an auxiliary condensation treatment part (500).

Figure 5:
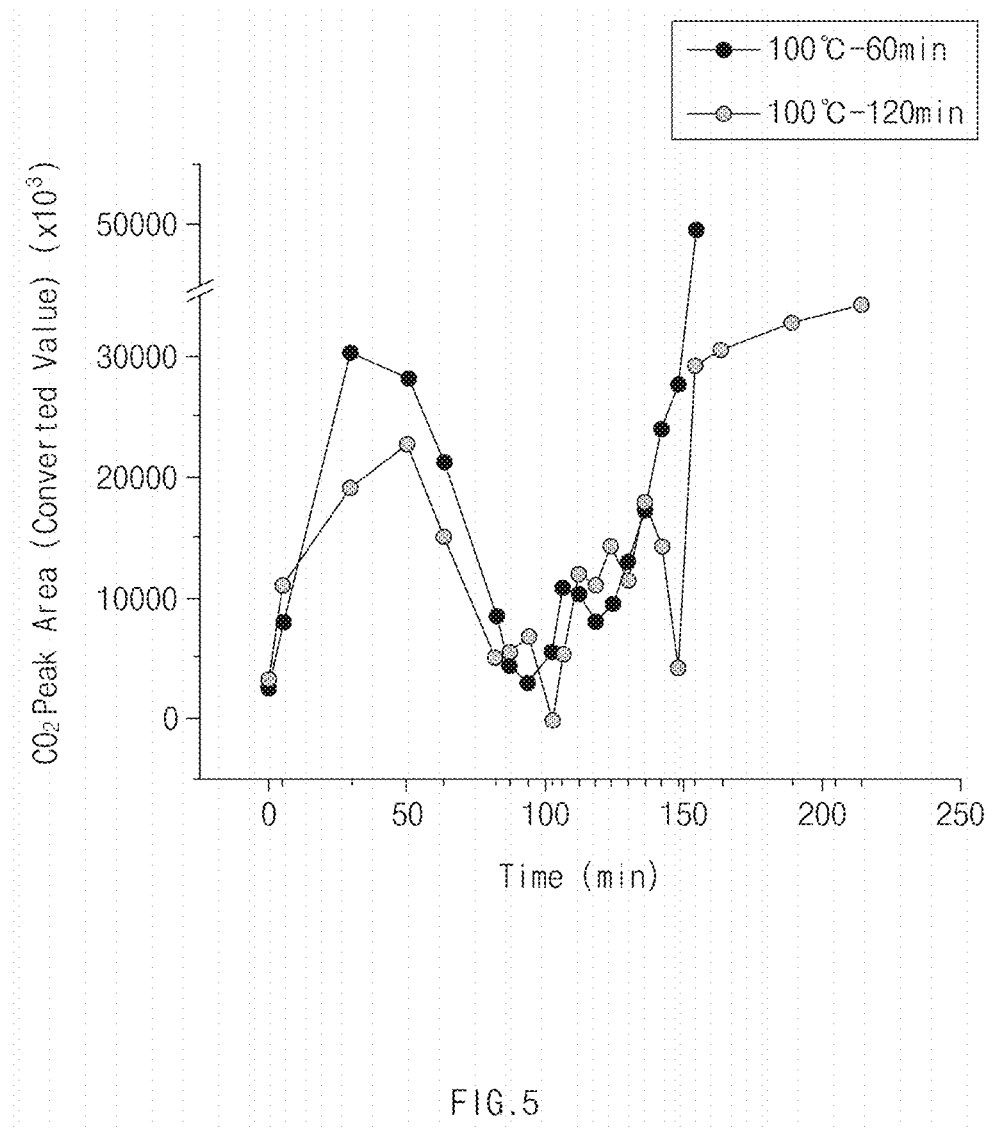
FIG. 5 shows monitoring results of a $CO_2$ flow amount (GC measurement) using a monitoring part of an equipment for treating a radioactive waste resin according to an embodiment of the present invention.

In an embodiment, in at least one section between step (S1) and step (S2), and after step (S2), a monitoring part (600) or a step of monitoring for sensing a gas flow amount (particularly, a carbon dioxide gas flow amount) including the C-14 radionuclide-containing compound, may be further included. Referring to FIG. 5, as a result of measuring the gas flow amount between step (S1) and step (S2), the amount of a gas generated in the treatment part for a radioactive waste resin (100) is reduced to about 100 minutes, but after that, the amount of the gas is continuously increased. This means the increase of the generating amount of the gas such as carbon dioxide due to the oxidation of the waste resin, and if such tendency is sensed, a step (system) for stopping the process in the treatment part for a radioactive waste resin (100) may be additionally provided. In addition, after step (S2) (in the latter part), the reduction of the amount of the gas before and after passing the C-14 radionuclide removing part (300) is required to be observed, but if the amount is not reduced, the performance of the adsorbent is required to check and replace.

Step (S2) may further include a preventing step of the leakage of the reactant from the treatment part for a radioactive waste resin (100) to the condensation part (200).

Step (S3) is for reusing the condensate water from which the gas including the C-14 radionuclide-containing compound is removed, in the treatment part for a radioactive waste resin (100).

The method of treating a radioactive waste resin according to the present invention may show reducing effects of the generating amount of waste generated during the whole process of treating the radioactive waste resin, because the treating process of a radioactive waste resin may be performed without supplying additional storing solution, or at least with a reduced amount of a newly supplied storing solution from the outside by recycling condensate water from which a gas including a C-14 radionuclide-containing compound is removed after separating and removing a gas including a C-14 radionuclide-containing compound from the condensate water formed by condensing tritiated water-containing vapor in an exhaust gas derived from the treatment part for a radioactive waste resin, together with a storing solution into the treatment part for a radioactive waste resin (100).

Step (S3) may include a controlling step of the supplying rate of condensate water so that the volume of the storing solution is maintained to 10 vol % to 30 vol % based on the total volume of the radioactive waste resin in the treatment part for a radioactive waste resin (100).

In an embodiment, if the volume of the waste resin in the treatment part for a radioactive waste resin (100) is fixed to about 60 vol %, at an early stage of the treating process in the treatment part for a radioactive waste resin (100), 30 vol % of the condensate water and 10 vol % of the storing solution are supplied, but condensate water reused once or more is supplied. At a point where the concentration of concentrated tritiated water reaches 50% of maximum tolerance, the supplying rate of the condensate water is controlled so that 20 vol % of the condensate and 20 vol % of the storing solution are supplied.

In the method of treating a radioactive waste resin, each step may be performed by a batch type, a semibatch type or a continuous type, without limitation.

In the method of treating a radioactive waste resin, the amount of a solution newly supplied from the outside may be reduced by recycling the condensate water, and the generating amount of the total waste may be reduced. In addition, since a continuous type may be performed, the method may be usefully utilized for the treatment of a large capacity of a waste resin.

The equipment for treating a radioactive waste resin of the present invention includes: a treatment part for a radioactive waste resin (100); a condensation part (200) for condensing tritiated water-containing vapor in an exhaust gas derived from the treatment part for a radioactive waste resin; an exhaust gas supply line (102) for supplying the exhaust gas from the treatment part for a radioactive waste resin to the condensation part; a C-14 radionuclide removing part (300) for removing a gas separated and discharged from the condensation part and including a C-14 radionuclide-containing compound; and a condensate water recycling line (201) for recycling tritiated water-containing condensate water in the condensation part into the treatment part for a radioactive waste resin.

The C-14 radionuclide removing part (300) may include an adsorbent for adsorbing the C-14 radionuclide-containing compound.

Figure 4:
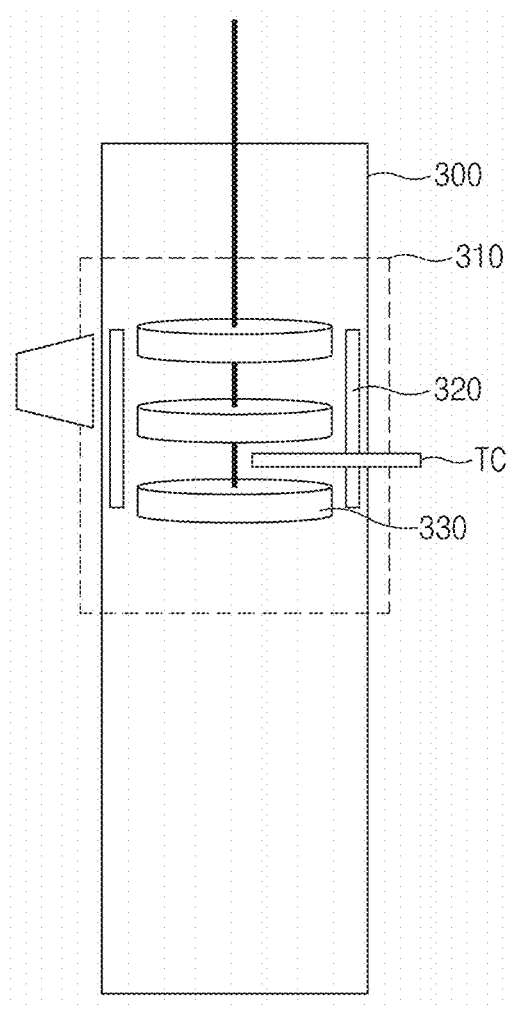
FIG. 4 is a schematic diagram of a C-14 radionuclide removing part in an equipment for treating a radioactive waste resin according to an embodiment of the present invention.

In an embodiment, as in FIG. 4, the C-14 radionuclide removing part (300) may include a heat treatment part (310) for heating the adsorbent. In the heat treatment part, the adsorbent is selectively heated to remove tritiated water-containing vapor from the adsorbent. The heat treatment part (310) may include a microwave system. In addition, as in FIG. 4, the heat treatment part (310) may further include a heating element (320) and an adsorbent tray (330). The shape of the heating element (320) is not limited, and may be, for example, a plate shape and may be transformed into the shape of the adsorbent tray. The material of the heating element is not limited, and may be composed of, for example, SiC. The adsorbent tray may be provided in several along the moving path of the adsorbent, and the shape is not limited and may be, for example, a plate shape.

Figure 1:
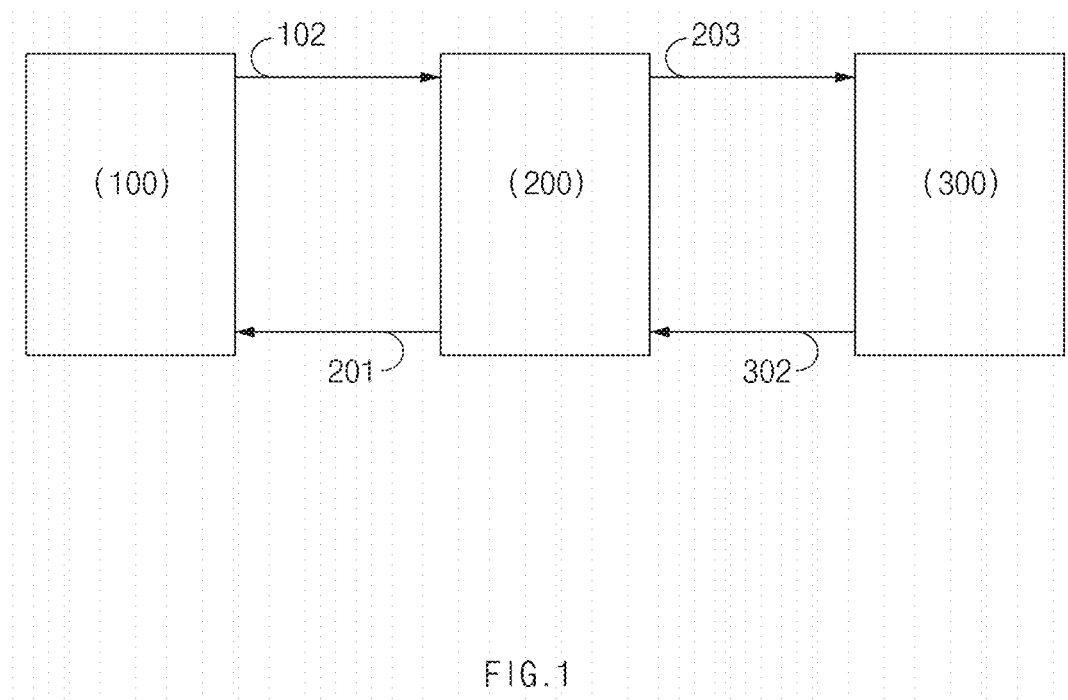
FIG. 1 is a schematic diagram of an equipment for treating a radioactive waste resin according to an embodiment of the present invention.

In an embodiment, as in FIG. 1, the equipment for treating a radioactive waste resin may further include a re-condensate water recycling line (302) for recycling moisture separated from the C-14 radionuclide removing part (300), particularly, tritiated water-containing moisture into the condensation part (200).

In an embodiment, as in FIG. 2, the equipment for treating a radioactive waste resin may further include a tritiated water removing part (400) for removing tritiated water in the condensate water discharged from the condensation part (200). In addition, a condensate water discharging line (204) for discharging condensate water from the condensation part to the tritiated water removing part (400) may be further included.

Figure 3:
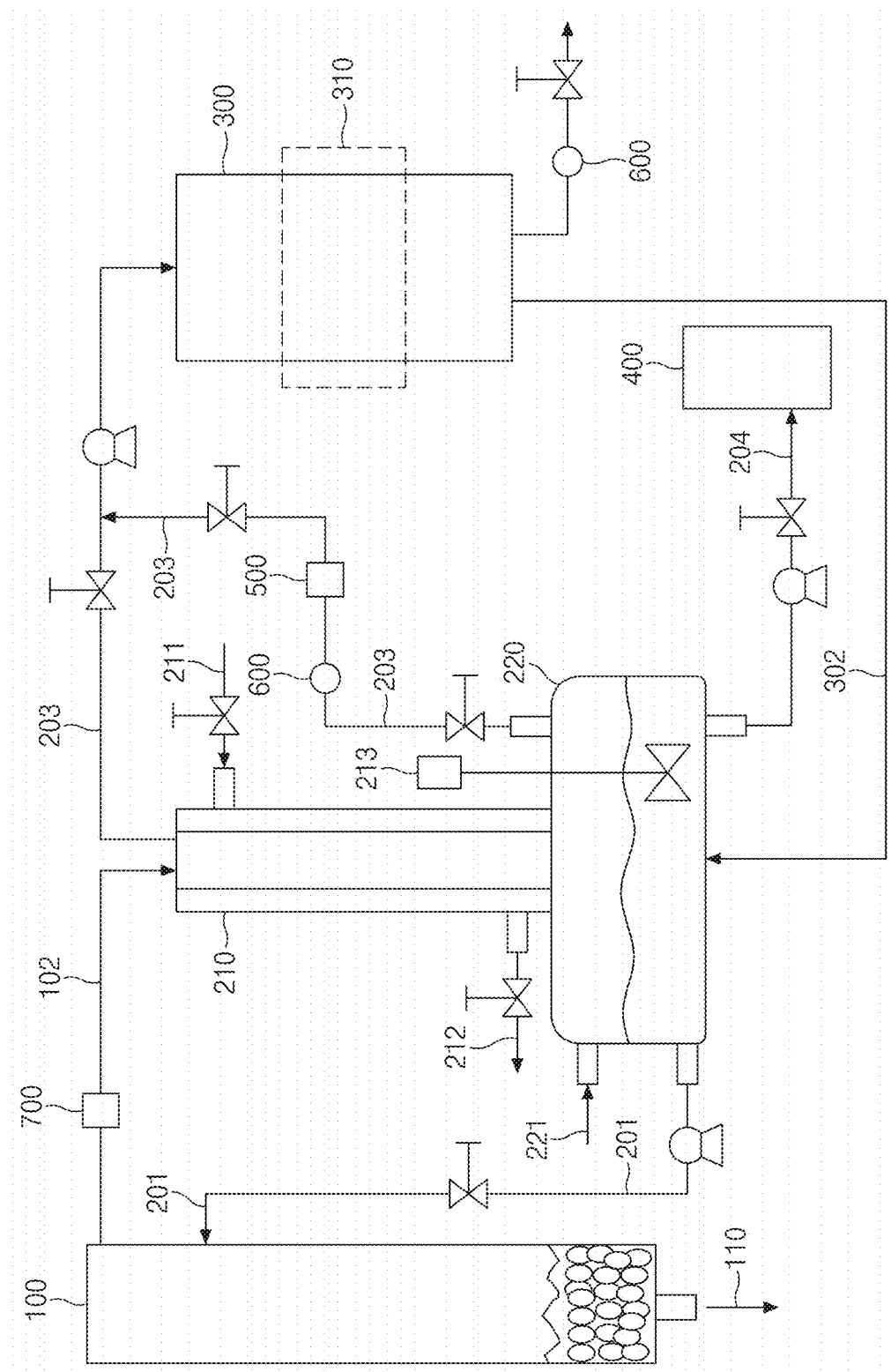
FIG. 3 is a schematic diagram of an equipment for treating a radioactive waste resin according to an embodiment of the present invention.

In an embodiment, as in FIG. 3, the condensation part (200) may include a condenser (210) and a condensate water storing part (220) for injecting the exhaust gas discharged from the treatment part for a radioactive waste resin (100) through the exhaust gas supplying line (102) into the condenser (210), and injecting the condensate water formed by the condenser into the condensate water storing part (220). The condensation part (200) may further include a cooling water inlet line (211) and a cooling water discharging line (212), connected with the condenser. In addition, the condensation part (200) may further include an acid solution inlet (221) for discharging a gas including the C-14 radionuclide-containing compound by the injection of the acid solution. In addition, the condensation part (200) may further include a stirrer (213) for stirring the condensate water for increasing the discharging efficiency of the gas including the C-14 radionuclide-containing compound. In addition, the condensate water storing part (220) may further include a heating means for volatilizing and discharging the gas including the C-14 radionuclide-containing compound by heating the condensate water to a certain temperature.

In an embodiment, an auxiliary condensation treatment part (500) provided between the condensation part (200) and the C-14 radionuclide removing part (300), may be further included.

In an embodiment, at least one monitoring part (600) for sensing the flow amount of the gas including the C-14 radionuclide-containing compound may be further included in at least one section between the condensation part (200) and the C-14 radionuclide removing part (300), and after the C-14 radionuclide removing part (300), and the monitoring part may include a carbon dioxide detection part. In addition, the carbon dioxide detection part may include an IR sensor or a gas chromatography.

In an embodiment, a reactant blocking part (700) provided between the treatment part for a radioactive waste resin (100) and the condensation part (200) for preventing the leakage of the reactant from the treatment part for a waste resin to the condensation part, may be further included. The reactant blocking part (700) may include a pressure gauge and a mesh filter, and by installing pressure gauges at the front part and rear part of the mesh filter, the collection of the reactant or not could be found according to the pressure change between the front part and the rear part, and at the same time, the leakage of the reactant to the condensation part due to the progress of the excessive reaction in the treatment part for a radioactive waste resin, may be prevented.

In each of FIG. 1 to FIG. 3, each element which may be further included in the equipment for treating a radioactive waste resin is designated in one drawing, but the element which may be further included is not limited to the inclusion in one equipment.

Hereinafter, embodiments will be suggested to assist the understanding of the present invention referring to FIG. 3 to FIG. 5. However, the embodiments below are provided for easier understanding of the present invention, and the scope of the present invention is not limited by the embodiments below.

Example 1 a) 10 g of an IRN-150 mixed waste resin containing a C-14 radionuclide, stored in a heavy-water reactor nuclear power plant was injected in a treatment part for a radioactive waste resin (100), and after 40 minutes from the operation of microwaves under a temperature of 100° C., condensate water was supplied through a condensate water recycling line (210) to the treatment part for a radioactive waste resin (100), and heating was performed for 120 minutes to produce an exhaust gas including tritiated water and a C-14 radionuclide-containing compound. In this case, the condensate water was supplied so that the volume of a storing solution was maintained to about 15 vol % based on the total volume of the radioactive waste resin in the treatment part for a radioactive waste resin (100).

b) The exhaust gas produced and discharged by the heating in step a) was injected into a condensation part (200) to condense tritiated water-containing vapor to obtain 500 mL of condensate water. Then, heating was performed at 70° C. for 30 minutes while maintaining the pH of the condensate water in a condensate water storing part (220) at the bottom of the condensation part (200) to 6.9.

c) A gas including a C-14 radionuclide-containing compound, produced and discharged from the condensation part (200) by the heating of step b) was injected through a C-14-containing gas discharging line (203) into a C-14 radionuclide removing part (300) to be adsorbed in an adsorbent. In this case, in order to remove tritiated water-containing vapor remaining in the adsorbent (CaO material), heating was performed at a temperature of 600° C. for 2 hours under a nitrogen atmosphere using a heat treatment part (310). By the heating in step b), C-14 radionuclide-containing $^{14}CO_3^{2-}$ was removed from a condensate water storing part (220) of the condensation part (200), and a transporting ratio to the C-14 radionuclide removing part (300) at the rear part thereof was shown up to about 95%.

In addition, in step b), in case of controlling pH to 3-5 by adding phosphoric acid to the condensate water, or controlling pH to about 7.2, the removing and transporting ratio of the C-14 radionuclide-containing $^{14}CO_3^{2-}$ was similar to the ratio above.

Comparative Example 1

The same procedure in Example 1 was conducted except for not supplying (recycling) the condensate water to the treatment part for a radioactive waste resin (100) in step a) of Example 1.

<Experimental Example 1> (Improvement of Removing Ratio of C-14 Radionuclide of Treatment Part for Radioactive Waste Resin by Recycling of Condensate Water)

In step a) of Example 1 and Comparative Example 1, an IRN-150 mixed waste resin was collected before and after heating the treatment part for a radioactive waste resin (100), and the amount of a C-14 radionuclide present on a waste resin was measured, and the removing ratio of the C-14 radionuclide was calculated. The amount of the C-14 radionuclide in a specimen was used after obtaining an average value of measured values for each position of the specimen.

TABLE 1

|  |  |  |  | C-14 radionuclide removing ratio (%) | | |
| --- | --- | --- | --- | --- | --- | --- |
|  | Temperature (° C.) | Heating time (min) | Condensate water injection | Amount of C-14 radionuclide before heating (Bq/g) | Amount of C-14 radionuclide after heating (Bq/g) | Removing ratio (%) |
| Example 1 | 100 | 120 | Inject | $7.86 \times 10^6$ | $1.77 \times 10^5$ | 97.7 |
| Comparative Example 1 | 100 | 120 | Not inject | $7.86 \times 10^6$ | $1.42 \times 10^6$ | 81.9 |

In case of supplying (recycling) condensate water (Example 1), the removing ratio of the C-14 radionuclide in the radioactive waste resin was about 97.7%, and the removing ratio of the C-14 radionuclide was effective when compared to a case of not supplying (recycling) condensate water (Comparative Example 1). In addition, in Example 1, since the condensate water recycled from the equipment for treating a radioactive waste resin of the present application is reused, there are advantages in that moisture is not required to be separately supplied from the outside.

<Experimental Example 2> (Improvement of Removing Ratio of Tritiated Water-Containing Vapor Through Heating Adsorbent by Heat Treatment Part of C-14 Radionuclide Removing Part)

In step c) of Example 1, the weights and moisture contents of the adsorbent before and after heating by a heat treatment part (310) were measured by a thermal weight analyzer (TG 209 F1 Libra, manufactured by Netzsch Co.), and the removing ratio of tritiated water-containing vapor was calculated.

TABLE 2

|  |  |  | Weight change and moisture removing ratio | | |
| --- | --- | --- | --- | --- | --- |
|  | Temperature (° C.) | Heating time (min) | Moisture content/ Weight before heating (g) | Moisture content/ Weight after heating (g) | Moisture removing ratio (%) |
| Example 1 | 600 | 120 | 8.06/15.5 | 0.15/7.6 | 98.2 |

In the adsorbent of Example 1, the moisture (tritiated water-containing vapor) was removed by 98% or more, and since the C-14 radionuclide-containing compound adsorbed by the adsorbent is present in a type of $CaCO_3$ or $BaCO_3$, which has a decomposition temperature of 850° C. or more, the C-14 radionuclide-containing compound may be decomposed at the heating temperature of Example 1, and only tritiated water-containing vapor may be separated without separating/leaking the C-14 radionuclide.

Accordingly, as in Example 1, only the tritiated water-containing vapor in the adsorbent may be selectively/effectively removed, and at the same time, the purity of a C-14 radioactive isotope captured in the adsorbent may be increased.

EXPLANATION OF SYMBOLS

100: treatment part for radioactive waste resin
102: exhaust gas supplying line
110: radioactive waste resin discharging line
200: condensation part
201: condensate water recycling line
203: C-14-containing gas discharging line
204: condensate water discharging line
210: condenser
211: cooling water inlet line
212: cooling water discharging line
213: stirrer
220: condensate water storing part
221: acid solution inlet
300: C-14 radionuclide removing part
302: re-condensate water recycling line
310: heat treatment part
320: heating element
330: adsorbent tray
400: tritiated water removing part
500: auxiliary condensation treatment part
600: monitoring part
700: reactant blocking part

What is claimed is:

1. A method of treating a radioactive waste resin, the method comprising:
   (S1) condensing tritiated water-containing vapor in an exhaust gas derived from a treatment part for a radioactive waste resin, in a condensation part;
   (S2) discharging and removing a gas comprising a C-14 radionuclide-containing compound in the exhaust gas from the condensation part; and
   (S3) recycling tritiated water-containing condensate water in the condensation part into the treatment part for a radioactive waste resin.

2. The method of treating a radioactive waste resin of claim 1, further comprising prior to step (S1),
   (S0) heating the radioactive waste resin in the presence of tritiated water-containing moisture in the treatment part for a radioactive waste resin to generate an exhaust gas comprising tritiated water-containing vapor and a C-14 radionuclide-containing compound.

3. The method of treating a radioactive waste resin of claim 2, wherein the heating utilizes microwaves.

4. The method of treating a radioactive waste resin of claim 1, wherein, in step (S2), the gas comprising the C-14 radionuclide-containing compound is discharged in a gas phase by injecting an acid solution into condensate water in the condensation part.

5. The method of treating a radioactive waste resin of claim 1, wherein, in step (S2), the C-14 radionuclide-containing compound discharged from the condensation part is removed by an adsorbent.

6. The method of treating a radioactive waste resin of claim 5, further comprising separating and re-condensing the tritiated water-containing vapor remaining in the adsorbent from the adsorbent by heating the adsorbent to recycle into the condensation part.

7. The method of treating a radioactive waste resin of claim 1, wherein step (S3) comprises controlling a supplying rate of the condensate water to maintain a volume of a storing solution to 10 vol % to 30 vol % based on a total volume of the radioactive waste resin in the treatment part for a radioactive waste resin.

8. The method of treating a radioactive waste resin of claim 1, wherein step (S2) further comprises additionally condensing the tritiated water-containing vapor in the exhaust gas.

9. The method of treating a radioactive waste resin of claim 1, further comprising sensing a flow amount of a gas comprising the C-14 radionuclide-containing compound in at least one section between step (S1) and step (S2), and after step (S2).

10. The method of treating a radioactive waste resin of claim 1, further comprising (S4) removing tritiated water in the condensate water by discharging the tritiated water-containing condensate water in the condensation part.

11. The method of treating a radioactive waste resin of claim 1, wherein the tritiated water comprises at least one selected from the group consisting of $T_2O$, HTO and DTO.

12. The method of treating a radioactive waste resin of claim 1, wherein the C-14 radionuclide-containing compound comprises $^{14}CO_2$.

* * * * *